US011616823B2

(12) United States Patent
Sen et al.

(10) Patent No.: US 11,616,823 B2
(45) Date of Patent: Mar. 28, 2023

(54) METHODS, SYSTEMS, AND DEVICES FOR STREAMING VIDEO CONTENT ACCORDING TO AVAILABLE ENCODING QUALITY INFORMATION

(71) Applicants: AT&T Intellectual Property I, L.P., Atlanta, GA (US); The University of Connecticut, Farmington, CT (US)

(72) Inventors: Subhabrata Sen, Westfield, NJ (US); Bing Wang, Storrs Mansfield, CT (US); Yanyuan Qin, Storrs Mansfield, CT (US)

(73) Assignees: AT&T Intellectual Property I, L.P., Atlanta, GA (US); The University of Connecticut, Farmington, CT (US)

( * ) Notice: Subject to any disclaimer, the term of this patent is extended or adjusted under 35 U.S.C. 154(b) by 0 days.

(21) Appl. No.: 17/463,817

(22) Filed: Sep. 1, 2021

(65) Prior Publication Data

US 2023/0069178 A1 Mar. 2, 2023

(51) Int. Cl.
*H04L 65/70* (2022.01)
*H04L 12/14* (2006.01)
*H04L 47/38* (2022.01)
*H04L 65/80* (2022.01)
(Continued)

(52) U.S. Cl.
CPC .......... *H04L 65/70* (2022.05); *H04L 12/1432* (2013.01); *H04L 47/38* (2013.01); *H04L 65/75* (2022.05); *H04L 65/80* (2013.01); *H04N 21/2662* (2013.01)

(58) Field of Classification Search
CPC ..... H04L 12/14; H04L 65/70; H04L 12/1432; H04L 47/38; H04L 65/75; H04L 65/80; H04L 65/756; H04L 65/752; H04N 21/2662
See application file for complete search history.

(56) References Cited

U.S. PATENT DOCUMENTS

| 2013/0097309 A1* | 4/2013 | Ma | H04L 67/02 709/224 |
| 2016/0234078 A1* | 8/2016 | Jana | H04L 47/30 |
| 2017/0134458 A1* | 5/2017 | Lau | H04M 15/8016 |

(Continued)

OTHER PUBLICATIONS

Qin, Yanyuan et al., "Quality-aware Strategies for Optimizing ABR Video Streaming QoE and Reducing Data Usage", MM Sys'19, Jun. 18-21, 2019, Amherst, MA, USA, 2019, pp. 189-200.

*Primary Examiner* — Schquita D Goodwin
*Assistant Examiner* — Mehulkumar J Shah
(74) *Attorney, Agent, or Firm* — Guntin & Gust, PLC; Jay H. Anderson

(57) ABSTRACT

Aspects of the subject disclosure may include, for example, embodiments that comprise obtaining a data budget associated with a communication session for streaming video content over a communication network from a video content server, determining a first portion of the data budget that is associated with a first segment of the video content, and obtaining quality information associated with the video content from the video content server over the communication network. Further embodiments can include identifying a first group of tracks for the first segment, and determining a first target quality for the first segment based on the first portion of the data budget and the quality information. Other embodiments are disclosed.

20 Claims, 12 Drawing Sheets

(51) Int. Cl.
  *H04N 21/2662* (2011.01)
  *H04L 65/75* (2022.01)

(56) References Cited

U.S. PATENT DOCUMENTS

| | | | |
|---|---|---|---|
| 2017/0134459 A1* | 5/2017 | Shetty | H04L 65/80 |
| 2018/0242015 A1* | 8/2018 | Katsavounidis | G11B 20/00007 |
| 2018/0262439 A1* | 9/2018 | Moorthy | H04L 47/70 |
| 2020/0067852 A1* | 2/2020 | Sen | H04L 65/752 |
| 2020/0169736 A1* | 5/2020 | Petajan | H04N 19/154 |
| 2020/0206618 A1* | 7/2020 | Perlman | H04N 21/4263 |
| 2021/0081468 A1* | 3/2021 | Raman | H04L 67/535 |

* cited by examiner

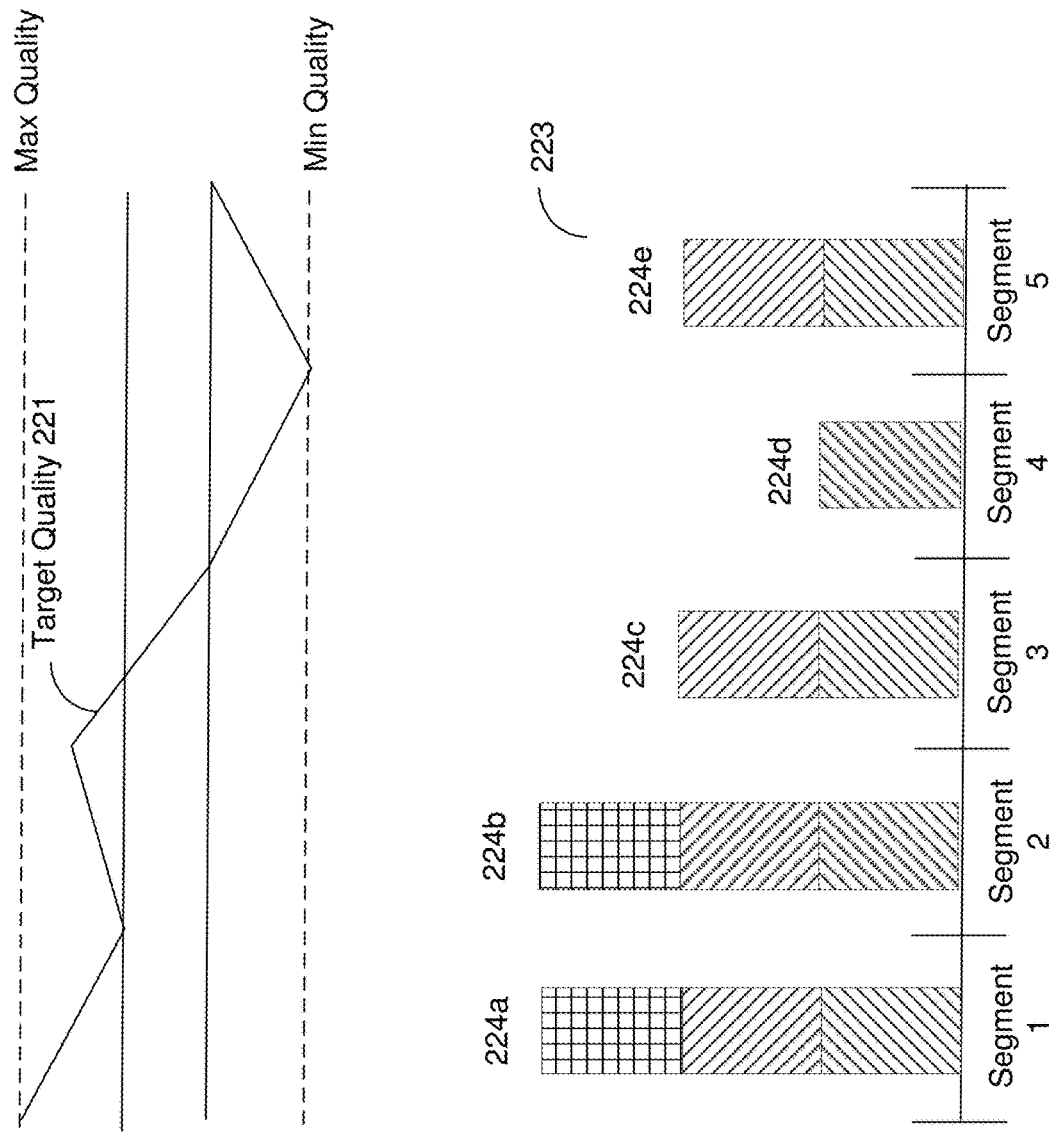
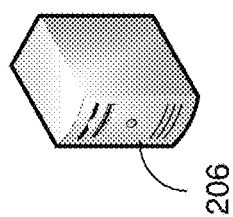
FIG. 2B

Determining Target Quality Utilizing Binary Search Algorithm

Input: Per-segment size, per-segment quality, data budget D, minimum quality $q_{low}$, maximum quality $q_{high}$
Output: Target quality
while $q_{high} - q_{low} > \delta_1$ do
    $q_{mid}=(q_{low}+q_{high})/2$
    /*Compare D and $S(q_{mid})$*/
    if $|D-S(q_{mid}))< \delta_2$ then
        return $q_{mid}$
    else if $S(q_{mid})<D$ then
        recur for the right half, $q_{low} = q_{mid}$
    else
        recur for the left half, $q_{high} = q_{mid}$
    end
end
return $q_{low}$

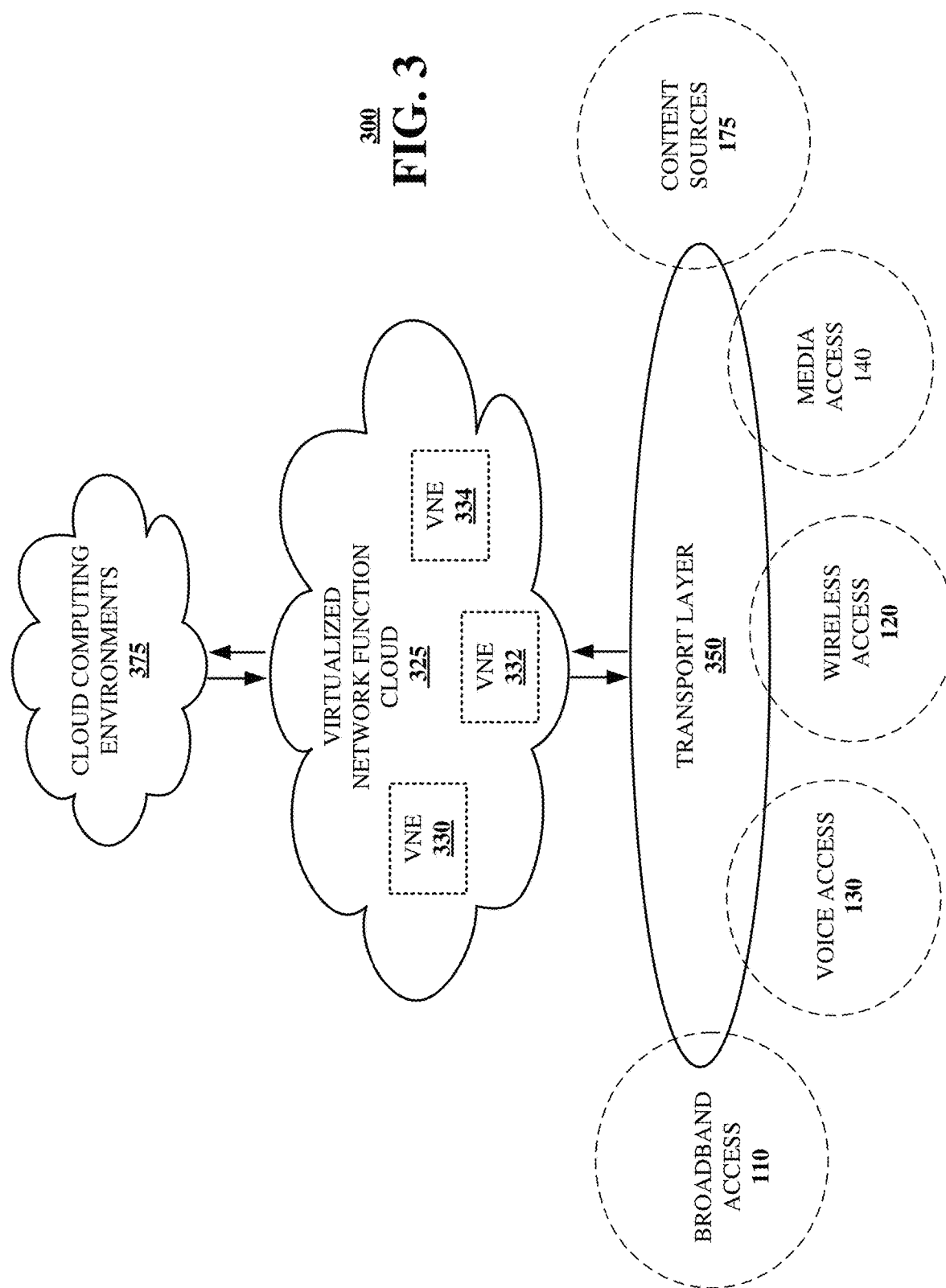

METHODS, SYSTEMS, AND DEVICES FOR STREAMING VIDEO CONTENT ACCORDING TO AVAILABLE ENCODING QUALITY INFORMATION

FIELD OF THE DISCLOSURE

The subject disclosure relates to methods, systems, and devices for streaming video content according to available encoding quality information.

BACKGROUND

Over-the-top (OTT) mobile video content streaming is extremely popular, accounting for the bulk of traffic on cellular networks. Video content streaming is bandwidth intensive and places a heavy demand on users' limited monthly cellular data budgets. In addition, it is equally important that the streaming session delivers a good viewing experience to ensure good user Quality of Experience (QoE). However, this can be challenging to achieve especially when streaming over cellular networks, given both the relatively high bandwidth requirements of streaming video, and the highly dynamic cellular network conditions, which can exhibit high network bandwidth variability over time. Adaptive Bitrate (ABR) streaming (mainly using Dynamic Adaptive Streaming over HTTP (DASH) and HTTP Live Streaming (HLS) protocols) has emerged as the de facto OTT video content streaming technology. In ABR streaming, for each video content, the video content server creates an ABR track ladder, comprising of multiple independent ABR tracks, each encoding the same portion of video content, but differing in terms of frame rate, encoding bitrate, resolution, or perceptual quality. Each ABR track is further divided into a series of segments, each containing data for a few seconds' (typically 2-10 seconds) worth of playback. For each segment position in the video content, the encoding bitrates, and hence the perceptual quality, generally progressively increase going from lower to higher tracks. During streaming playback, the ABR client streaming application leverages an adaptation logic to dynamically determine which quality variant (i.e., which ABR track) to fetch for each segment position in the video content, based on available network bandwidth and other factors. For good QoE, the ABR client streaming application needs to account for and balance across the conflicting goals of maximizing quality, minimizing rebuffering, and minimizing quality changes. In the current state of the art, ABR video streaming strategies focus mainly on maximizing the QoE.

BRIEF DESCRIPTION OF THE DRAWINGS

Reference will now be made to the accompanying drawings, which are not necessarily drawn to scale, and wherein:

FIGS. 2A-2D are block diagrams illustrating example, non-limiting embodiments of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
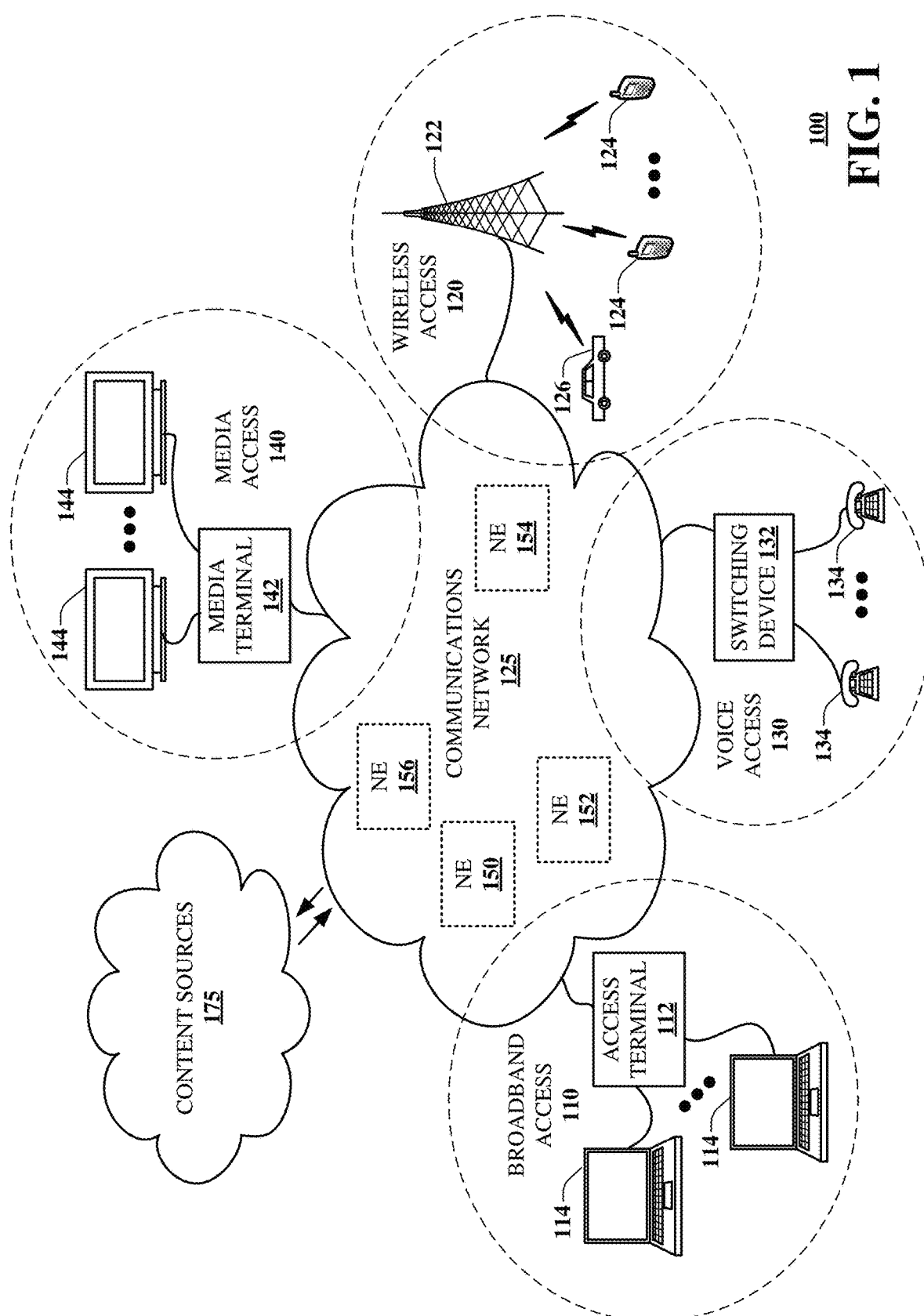
FIG. 1 is a block diagram illustrating an exemplary, non-limiting embodiment of a communications network in accordance with various aspects described herein.

The subject disclosure describes, among other things, illustrative embodiments for obtaining a data budget associated with a communication session for streaming video content over a communication network from a video content server, determining a first portion of the data budget that is associated with a first segment of the video content, and obtaining quality information associated with the video content from the video content server over the communication network. Further embodiments include identifying a first group of tracks for the first segment, and determining a first target quality for the first segment based on the first portion of the data budget and the quality information. Other embodiments are described in the subject disclosure.

One or more aspects of the subject disclosure include a communication device, comprising a processing system including a processor; and a memory that stores executable instructions that, when executed by the processing system, facilitate performance of operations. The operations can comprise obtaining a data budget associated with a communication session for streaming video content over a communication network from a video content server, determining a first portion of the data budget that is associated with a first segment of the video content, and obtaining quality information associated with the video content from the video content server over the communication network. Further operations comprise identifying a first group of tracks for the first segment, and determining a first target quality for the first segment based on the first portion of the data budget and the quality information.

One or more aspects of the subject disclosure include a non-transitory, machine-readable medium, comprising executable instructions that, when executed by a communication device including a processor, facilitate performance of operations. The operations can comprise obtaining a data budget associated with a communication session for streaming video content over a communication network from a video content server, determining a portion of the data budget that is associated with a first segment of the video content, and identifying a first group of tracks for the first segment. Further operations comprise determining an available bandwidth associated the communication network, obtaining quality information associated with the video content from the video content server over the communication network, and determining a first target quality for the first segment based on the portion of the data budget, the quality information, and the available bandwidth.

One or more aspects of the subject disclosure include a method. The method can comprise obtaining, by a communication device including a processor, a data budget associated with a communication session for streaming video content over a communication network from a video content server, determining, by the communication device, a first portion of the data budget that is associated with a first segment of the video content, and obtaining, by the communication device, quality information associated with the video content from the video content server over the communication network. Further, the method can comprise identifying, by the communication device, a first group of tracks for the first segment, and determining, by the communication device, a first target quality for the first segment based on the first portion of the data budget and the quality information utilizing a binary search algorithm. In addition, the method can comprise identifying, by the communication device, a first portion of the first group of tracks according to the first target quality, and providing, by the communication device, a first request for the first portion of the first group of tracks to the video content server over the communication network.

Referring now to FIG. 1, a block diagram is shown illustrating an example, non-limiting embodiment of a system 100 in accordance with various aspects described herein. For example, system 100 can facilitate in whole or in part streaming video content according to available encoding quality information. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
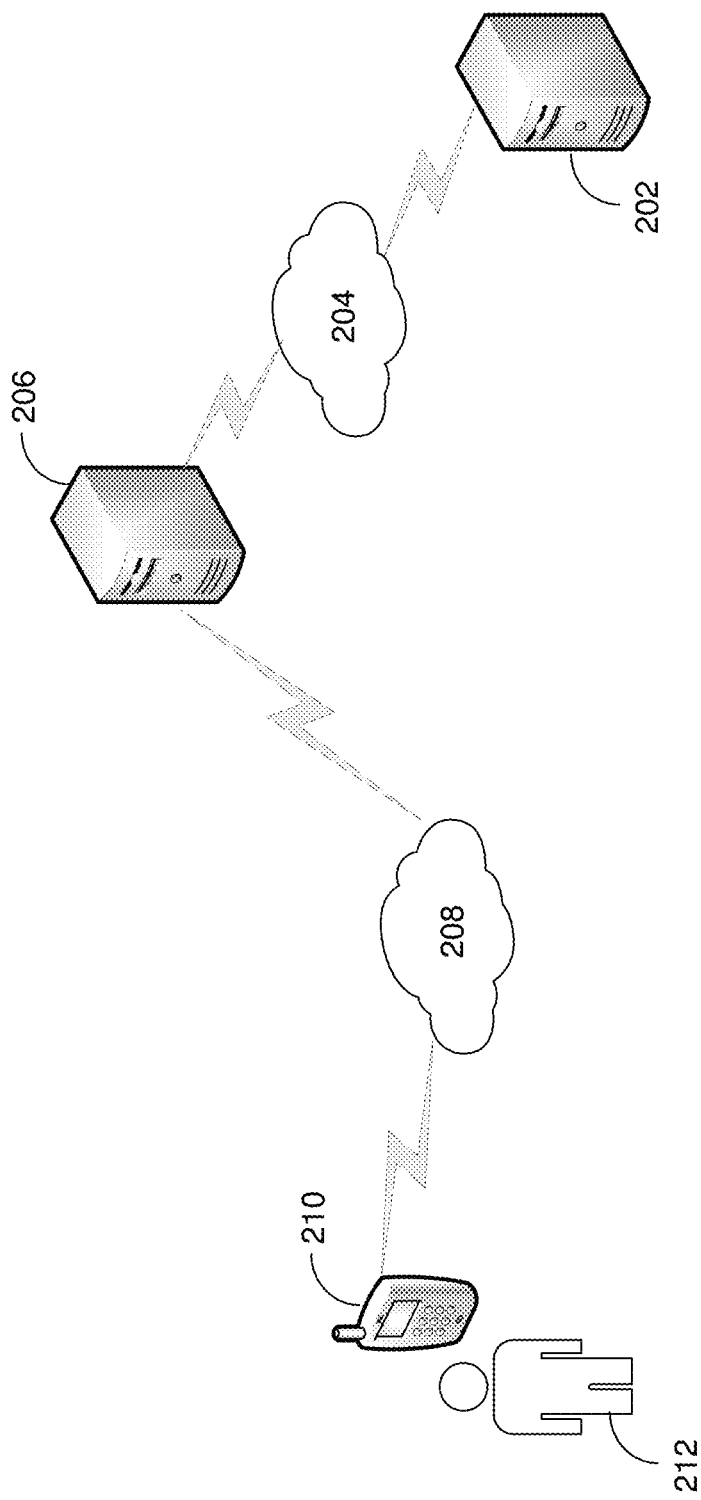
Figure 2C:
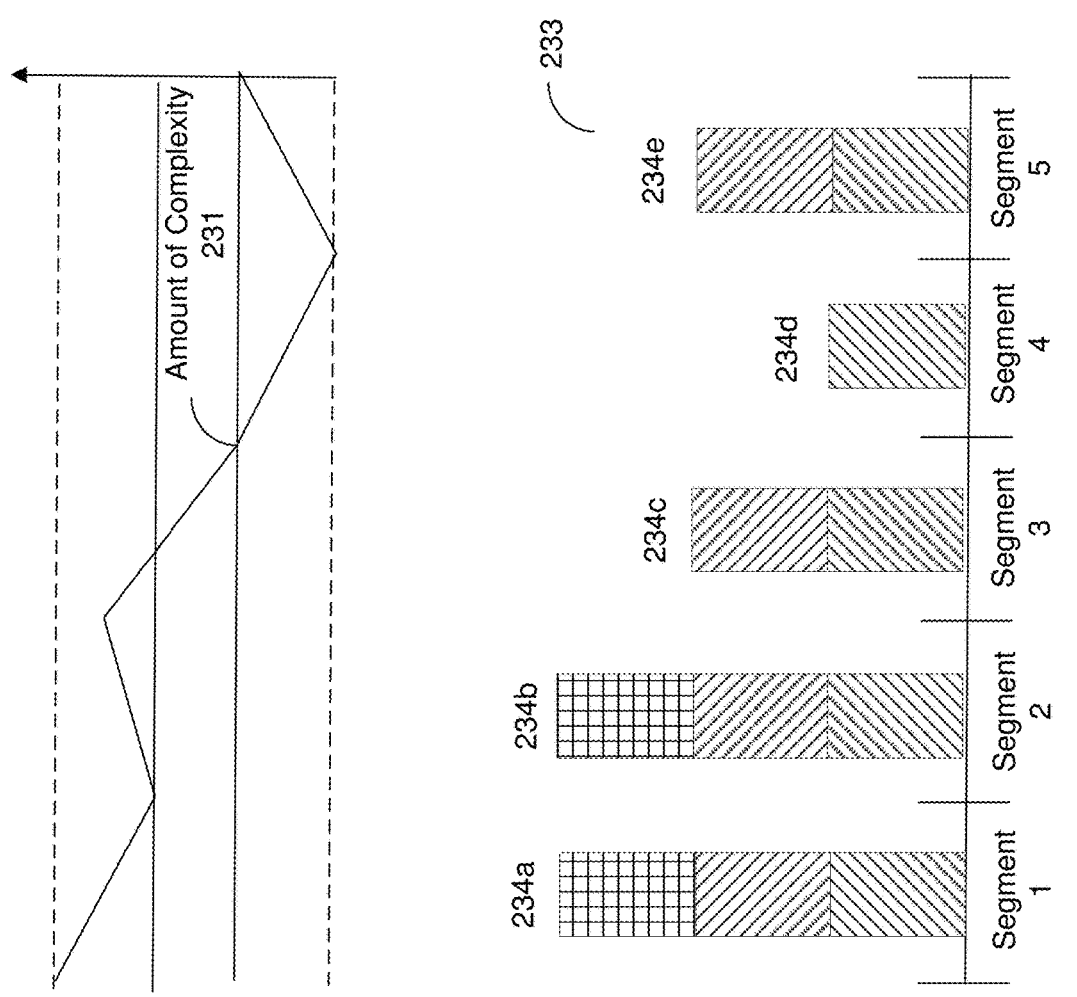

FIGS. 2A-2D are block diagrams illustrating example, non-limiting embodiments of a system functioning within the communication network of FIG. 1 in accordance with various aspects described herein. Referring to FIG. 2A, in one or more embodiments, the system 200 includes a video content server 202 communicatively coupled to a mobile network server 206 over a communication network 204. Further, system 200 comprises a communication device 210 associated with user 212 communicatively coupled to mobile network server 206 over communication network 208. Communication device 210 can comprise a mobile device, mobile phone, tablet computer, laptop computer, smartwatch, wearable device, augmented reality device, virtual reality device, or any other mobile device. In addition, each of the video content server 202 and mobile network server 206 can comprise one server, multiple servers in one location, multiple servers spanning multiple locations, one or more virtual servers in one location or multiple locations, or one or more cloud servers. In some embodiments, the functions of the mobile network server 206 and the video content server 202 can be performed by one server, multiple servers, a virtual server, or multiple virtual servers. Also, each of communication network 204 and communication network 208 comprises a wireless communication network, a wired communication network, or a combination thereof. Further, in some embodiments, portions or all of the functions described to be performed by the video content server 202 can be performed by the mobile network server 206.

In one or embodiments, user 212 can request video content to be streamed from video content server 202 via mobile network server 206 to communication device 210 over both communication network 204 and communication network 208. An ABR server streaming application executing on the video content server 202 can generate multiple ABR tracks for each segment of the video content Each ABR track is encoded differently to provide a different quality, alone or in conjunction with other tracks of the segment. The ABR client streaming application on the communication device 210 can identify and request a group of ABR tracks for each segment of video content to maximize quality, minimize rebuffering, and minimizing quality changes to provide user 212 with a QoE. However, there is a need for developing video content streaming solutions that can enable users to experience good video content streaming QoE while staying within their specific monthly data budgets according to user 212 cellular service subscription plans. This is an important and practical problem because cellular data is a relatively scarce resource, while streaming video has high bandwidth needs. For example, streaming one-hour of Standard Definition (SD) quality video on Netflix uses about 1 GB of data, while 1 hour of High Definition (HD) quality video on Netflix can consume as much as 3 GB, both of which are significant amount of data. Streaming video content therefore imposes a significant demand on the usage of cellular data. Thus, there is a need to develop technologies that can conserve cellular data usage associated with video content streaming. Further, any video delivery capability that is parsimonious with the associated network data consumption while still delivering adequate quality would be a valuable capability. It would enable users to stretch their data budgets and allow them to consume more video content within their data budgets with satisfactory QoE. In addition, reduced data usage per session translates to reduced load on the cellular network, hence potentially better QoE for other users sharing the same cellular infrastructure.

In one or more embodiments, some mobile network operators and commercial video services provide users some kind of "data saver" options (e.g., options to reduce data usage) in their subscription plans. Existing approaches in industry to reducing data usage are either service-based or network-based. A service-based data reduction approach is typified by a video service providing a user multiple options (e.g., "Good", "Better", "Best" options in a popular streaming applications) via the client player user interface (UI). Users can choose an option with a lower data usage at the cost of lower quality experience. The selected option is mapped to a specific tracks in the ABR track ladder (e.g., the multiple tracks generated by an ABR server streaming application on the video content server 202, each ABR track associated with a different quality), and the ABR track selection during playback by the ABR client streaming application on the communication device 210 is constrained to selecting from ABR tracks with quality/screen resolution/bitrates at or below that particular ABR track. In a network-based data reduction approach, a mobile network operator caps the maximum network bandwidth available to a video session to a fixed value (e.g., 1.5 Mbps), which indirectly has a similar effect of inducing the video content player to limit its selection of a specific ABR track and variants below it for each segment of video content. However, existing ABR adaptation schemes that are service-based or network-based can focus primarily on maximizing the video quality under the network bandwidth constraints, and not on limiting data usage for a user under a cellular data subscription plan.

In one or more embodiments, a user 212 can explicitly select a per-session data budget, and an embodiment can bound the data consumption by that selected data budget (in other embodiments, the mobile network server 206 can determine a per-session data budget based on the remaining data budget for the user 212 according to the user's cellular subscription plan that can be stored and accessed by the mobile network server 206 from an associated database). Overall, the current state-of-the-art can have difficulty in achieving a good balance between QoE and associated data usage, as it may not account for one or more important factors such as different video genres and encoding technologies, complexity and quality variability across different scenes in a segment, and different QoE vs bitrate tradeoffs for different ABR tracks. The current state-of-the-art also may not consider overall data usage in the ABR rate adaptation decision. Given the limitations of existing schemes, there is a real need for new and improved ABR adaptation solutions that explicitly consider the overall data usage and better balance the tradeoffs among video quality, rebuffering, quality changes, data budget, and bandwidth usage. Further embodiments can include a solution to this need in the context of Adaptive Bitrate (ABR) streaming, focusing on Video-on-Demand (VOD). Additional embodiments can include utilizing the user's data budget information to better manage and limit the data usage of mobile video streaming, while minimizing the impact on users' quality of experience (QoE) and still providing good QoE. The benefits include more efficient data usage, while working in conjunction with the existing ABR client streaming application on the communication device 210. This makes it possible for the wide base of services with existing deployed ABR technologies to still benefit from such a technology. Embodiments can include a data planning module/application (residing and executing on the communication device 210) that can be a component of the overall data-budget constrained ABR streaming architecture. Also, embodiments can include dynamically tracking the data usage and unused remaining data budget over time, rationing data usage by accounting for the remaining data budget and segments in a streaming session, steering the track selection of the ABR client streaming application on the communication device 210 towards delivering good QoE, and revisiting and adapting its plans appropriately over the lifetime of a communication session associated with the video content streaming. Embodiments are designed to reduce the adverse impacts on QoE when managing the streaming under session data budget constraint. A carefully designed scheme can judiciously plan and ration the data budget across the session, subject to time-varying available network bandwidths across the session and varying content complexities across the video, while steering the selection towards delivering good QoE. Additional embodiments can be specifically designed for scenarios where per-segment perceptual video quality information about the ABR tracks are available to the video client player. When per-segment quality is available, embodiments can explicitly take account of the quality information obtained from the video content sever 202 to achieve similar quality across the different video segments, while satisfying the data budget constraint.

In one or more embodiments, while the core ABR client streaming application runs on the communication device 210 after each segment is downloaded to determine the track for the next segment, embodiments of the data planning module/application, described herein, can run on the communication device 210 at a coarser time scale, e.g., every time interval or after every X segments that have been downloaded. For example, let D denote the data budget (in bytes) for a video content streaming session, which is selected by the user at the beginning of a communication session. Further embodiments can include the data planning module/application (stored and executed on the communication device 210) that can enable design of data planning strategies so that the total data consumed (application-level data) is bounded by D, while still maintaining a level of QoE. At the beginning of the ABR video content streaming, embodiments determine the target ABR track(s) for each segment based on the total data budget and per-segment size and quality. The target track $L_i$ for segment "i" represents an upper bound on the selection of the ABR track for that segment, which is then used in conjunction with the core ABR streaming application on communication device 210 to ensure that the selected track(s) for segment "i" does not exceed $L_i$ to satisfy the data budget constraint. Each instance the data planning module/application runs, it calculates the remaining data budget as the total data budget subtracted by the amount of data that has been consumed until then, and dynamically adjusts the target ABR track for each remaining segment position. When per-segment perceptual video quality information is available to the video content client player, the data planning module/application can explicitly take account of the quality information to achieve similar quality across the segments in the video playback, while satisfying the overall data budget constraint. This information is important and valuable because for the state-of-the-art codecs and video coding practices, different segments within the same track can have different perceptual quality (e.g., complex scenes have lower perceptual quality than simpler ones). Therefore, the availability of fine per-segment video quality information can be used to balance the perceptual quality across the video playback session through appropriate selection of track variants for each individual video segment index during the communication session. There are various ways that such video quality information can be communicated by the video server to the client player. In some embodiments, ABR server streaming application on the video content server 202 can share encoding quality information with communication device 210. For example, the DASH protocol that is associated with the ABR server streaming application can include quality metadata with the encoded content, which offers a path for eventually including such information in the manifest file shared by the mobile network server 206 and/or video content server 202 with the video client player (e.g., ABR client streaming application) on communication device 210. In the shorter term, this sharing with the client of the encoding quality information about the different ABR ladder track variants for each segment index can be achieved through an auxiliary information exchange, e.g., through a HTTP file transfer. The data planning module/application leverages per-segment perceptual video quality information as follows: data planning module/application is run periodically during a video content streaming session, each time determining per-segment target track(s) for each of the remaining video segment positions that have not yet been streamed from the video content server 202, considering the remaining available data budget. Further, the data planning module/application considers a video of "n" segment positions and a session data budget "D". In addition, the data planning module/application can be run in the middle of the session to identify the ABR track(s) for the remaining outstanding segment positions based on the remaining data budget. For example, assume that at time t, when the data planning module/application runs, there are "n" remaining segments left in streaming the video content from the video content server 202, and the remaining available unused data budget for the session is "D". D=total data budget limit for the session−cumulative data already consumed in the session up to time t. The following may occur: (1) When the data planning module/application runs at time t, it determines a target quality "q*", such that when the perceptual video quality of each remaining segment is capped close to q*, the associated total data usage for streaming the remaining segments is close to but below the remaining data budget D. The data planning module/application can determine q* as follows: Specifically, for segment index "i" (i.e., the ith segment in the video playback out of the n remaining segments), let q(i,l) denote the video quality and s(i,l) denote the size (in bytes) of this ith segment in the video track level "l" in the ABR track ladder. Given a specific target quality q, for segment index "i", let L(i,q) denote the track level for which the video quality of this ith segment is closest to q, i.e., $L(i, q) = \arg\min |q - q(i,l)|$, $1 <= l <= K$, where K=the total number of tracks in the ABR track ladder. The data planning module/application can repeat this operation for each segment index in the remaining n segment positions, and for each of these segment positions "i", where $1 <= i <= n$, the data planning module/application can determine the corresponding track level, L(i, q) for which the quality is closest to q. In this way, the data planning module/application can map quality q to a corresponding track level for each remaining segment. Let S(q) denote the total data usage corresponding to quality q, i.e., S(q)=the sum of the sizes of all remaining segments corresponding to the case where for each of the remaining segment indexes "i" ($1 <= i <= n$), the variant of the ABR track selected for streaming from the server is the corresponding segment variant from ABR track level L(i, q). Then, the data planning module/application can determine the target quality q* to be the maximum perceptual quality value such that the associated total remaining data usage is below D, i.e., $q^* = \arg\max S(q) <= D$, for all q. (2) Once the target quality q* is determined, the data planning module/application can determine the corresponding target track for each remaining segment position "I" ($1 <= I <= n$) as L(i, q*). (3) The output from the data planning module/application can be an association of a target ABR track for each remaining segment position. This output is used to limit the ABR track selection of the core ABR client streaming application running on the communication device 210 for each remaining segment "i" ($1 <= I <= n$), as described herein. (4) Note that the target quality is kept the same for all the remaining segments, to achieve a more consistent quality viewing experience which is desirable. In some embodiments the data planning module/application can use a binary search algorithm to determine the target quality q* efficiently (See FIG. 2D).

Referring to FIG. 2D, in one or more embodiments, in the binary search algorithm utilized to find the target quality for a segment, initially $q_{low}$ and $g_{high}$ represent the minimum and maximum quality of all the segments that is determined from the quality information obtained from the video content server, respectively. They are then adjusted based on whether S(q_mid), i.e., the total data usage corresponding to quality $q_{mid}$, is below or above the data budget D, where $q_{mid}$ is the quality in the middle of $q_{low}$ and $g_{high}$. If the difference of $S(q_{mid})$, and D is less than a small positive value $\delta_2$, $q_{mid}$ is returned as the target quality, or $q_{mid}$ is returned when $g_{high}$ and $q_{low}$ differ by less than a small positive value $\delta_1$. Note, utilizing a binary search algorithm to find a target get quality is one way in which to do so. Other embodiments can utilize other methods to find the target quality.

Referring to FIG. 2A, in one or more embodiments, the data planning module/application on the communication device 210 and the ABR client streaming application (e.g., ABR video client player) can interact with ABR server streaming application on the video content server 202. The data planning module/application on the communication device 210 can interact with the ABR client streaming application on the communication device 210 in 2 ways: (i) apply the target track as a cap after the ABR track selection made by the ABR client streaming application on the communication device 210 referred as "cap afterwards", and (ii) restricting the set of ABR tracks to be selected in the ABR client streaming application through the target track, i.e., if the target ABR track for segment index i is L(i) as determined by data planning module/application, then only ABR tracks 1 to L(i) are considered in the ABR streaming client application on the communication device 210, referred as "cap beforehand". In both ways, the data planning module/application on the communication device 210 can interact with the ABR client streaming application on the communication device 210 through well-defined APIs. This allows the data planning module/application to be retrofitted into an existing system (e.g., communication device 210) utilizing ABR streaming application.

In one or more embodiments, the frequency of running the data planning module/application can be determined. That is, the data planning module/application can run periodically to recalculate the target ABR tracks. In one embodiment, the data planning module/application can be run periodically, after every δ seconds (e.g., δ=20 seconds). In another embodiment, the data planning module/application can be run after N>=1 segments have been downloaded (e.g., N=5 segments). The data planning module/application can provide a streaming video delivery capability that is parsimonious with the associated network data consumption while still delivering adequate quality. Such capability is valuable to any video streaming service and/or network provider that wants to support: (i) ABR video content streaming over the network, and (ii) is interested at delivering robust high quality user experience, and making efficient use of network resources. The data planning module/application can enable a user 212 to stretch their data budgets further, and allow them to consume more video content within their data budgets with satisfactory QoE. In addition, reduced data usage per session translates to reduced load on the cellular network, and hence potentially better QoE for other users sharing the same cellular infrastructure. Reduced network data usage also leads to lower radio energy consumption, lower device resource usage and therefore lower heating on mobile devices. Embodiments across a wide range of cellular network conditions, using different videos covering diverse content types, codecs, and ABR track ladder settings show that the data planning module/application can successfully balance QoE while satisfying the data budget constraint. That is, the corresponding achieved QoE is close to that of running the state-of-the-art ABR client streaming application in standalone mode, but with substantially lower data usage.

In one or more embodiments, the video content server 202, via the mobile network server 206, can obtain a request for streaming video content from communication device 210 over communication network 208 and communication network 204. Further, the mobile network server 206 can obtain video content from the video content server 202 over communication network in response to the request and provide the video content or a portion thereof to the communication device 210. In addition, the mobile network server 206 can obtain a data budget associated with the communication device 210 from another network device and provide it to the communication device 210. In other embodiments, the data budget can be obtained by the communication device 210 from itself, from memory associated with the mobile network server 206, or a database that stores data budgets associated with different communication devices. Also, the communication device 210 can determine a portion of the data budget that is associated with a segment of the video content that is streaming during the communication session. Further, the video content server 202 can generate a group of ABR tracks (e.g., ABR track ladder) for the segment utilizing an adaptive bit-rate (ABR) streaming application on the video content server 202. Also, the video content server 202 can determine quality information associated with the video content from the amount of complexity of the scenes in each segment of the video content and provide the quality information to the communication device 210. In addition, the communication device 210 can determine a target quality for the segment based on the portion of the data budget and the quality information obtained from the video content server 202. In further embodiments, the communication device 210 can determine the target quality utilizing a binary search algorithm (See FIG. 2D).

In one or more embodiments, the communication device 210 can identify a portion of the group of ABR tracks utilizing the ABR streaming application on the communication device resulting in a group of selected tracks. In further embodiments, the communication device 210 can determine that the quality of the group of selected tracks is less than or equal to the target quality and provide a request for the group of selected tracks to the video content server 202 during the communication session. That is, the group of selected tracks are determined to have a quality in accordance with a data budget associated with the user 212 and therefore is requested by, and then provided to, the communication device 210, accordingly. In other embodiments, the communication device 210 can determine that the quality of the group of selected tracks is greater than the target quality, identify a quality of each track of the group of tracks, identify another portion of the group of tracks that has an associated quality that is less than or equal to the target quality resulting in another group of selected tracks, and provide a request for the other group of selected tracks to the video content server 202 during the communication session. That is, the ABR streaming application on the communication device 210 selected a portion of the group of tracks that had a quality higher than the target quality, but another portion of the group of tracks that are less than or equal to the target quality in accordance to the data budget associated with the user 212 is identified, requested, and provided to the communication device 210, accordingly.

In one or more embodiments, the communication device 210 can determine an available bandwidth of communication network 208, thereby determining the target quality for the segment of video content not only based on the portion of the data budget and the quality information of the video content obtained from the video content server, but also based on the available bandwidth of communication network 208.

In one or more embodiments, the communication device 210 can determine a time period within the communication session that it receives the stream of the video content from the video content server 202 and determine the associated target quality. In some embodiments, a time period can be associated with one segment while in other embodiments a time period can be associated with multiple segments. In further embodiments, the communication device 210 can determine a length of time of the communication session and the determining of the time period can be based on the length of time of the communication session (i.e., the time period is a portion of the length of time associated with the communication session). In other embodiments, the communication device 210 can receive user-generated input that indicates the time period.

In one or more embodiments, the communication device 210 can identify another segment (from multiple of segments) associated with another time period within the communication session. Further, the communication device 210 can identify another group of tracks for the other segment utilizing the ABR client streaming application. In addition, the communication device 210 can determine another target quality for the other segment based on another portion of the data budget. Also, the communication device 210 can identify ABR tracks from the other group of ABR tracks based on the other target quality resulting in another group of selected ABR tracks according to the other target quality, and providing a request to the video content server 202 for the other group of selected tracks to the communication device running the communication session.

Referring to FIG. 2B, in one or more embodiments, the communication device can determine the target quality 221 for five segments of a communication session can fluctuate between a maximum quality and a minimum quality (each segment can be associated with a different time period and a different target quality) from quality information obtained from the video content server 202. Further, the ABR server streaming application on the video content server 202 can generate a group of ABR tracks 223 that comprises three tracks of different quality for each segment. For the first segment and the second segment, the target quality 221 determined by the communication device 210 is near the maximum quality such that the communication device 210 can identify and request a third ABR track 224*a* of encoding for the first segment and a third ABR track 224*b* for the second segment to provide the target quality 221. For the third segment, the target quality 221 determined by the communication device 210 is between the maximum quality and the minimum quality such that the communication device 210 can identify and request the second ABR track 224*c* of encoding for the third segment to provide the target quality 221. Further, for the fourth segment, the target quality 221 determined by the communication device 210 is toward the minimum quality such that the communication device 210 can identify and request a first ABR track 224*d* of encoding for the fourth segment to provide the target quality. In addition, for the fifth segment, the target quality 221 determined by the communication device 210 is between the maximum quality and the minimum quality such that the communication device 210 identifies and requests the second track 224*e* of encoding for the fifth segment to provide the target quality 221.

In some embodiments, the ABR encoding can include providing a group of ABR tracks to achieve a target quality. Multiple ABR tracks, in conjunction with one another, can achieve the target quality. That is, for example, the communication device 210 can identify and request all three ABR tracks 224*a* to achieve the target quality for the first segment and the video content server 202 can provide all three ABR tracks 224*a* to the communication device accordingly, and the communication device 210 can identify and request all three ABR tracks 224*b* to achieve the target quality for the second segment and the video content server 202 can provide all three ABR tracks 224*b* to the communication device accordingly. Further, the communication device 210 can identify and request the two ABR tracks 224*c* to achieve the target quality for the third segment and the video content server 202 can provide the two ABR tracks 224*c* to the communication device accordingly. In addition, the communication device 210 can identify and request a single ABR track 224*f* to achieve the target quality for the fourth segment and the video content server 202 can provide the single ABR track 224*d* to the communication device accordingly. Also, the communication device 210 can identify and request the two ABR tracks 224*e* to achieve the target quality for the fifth segment and the video content server 202 can provide the two ABR tracks 224*e* to the communication device accordingly Referring to FIG. 2C, in one or more embodiments, a video content server 202 can determine an amount of complexity 231 in a scene associated with each segment of five segments of video content within a communication session that streams the video content The amount of complexity can be associated with the quality of each segment of the video content to determine the quality information associated with the video content. Amount of complexity 231 can include amount of action within a scene in which an increase in quality (e.g., resolution) can enhance the user experience. Thus, an amount of complexity 231, in some embodiments, can have a relationship to quality of a segment. That is, the amount of complexity 231 in FIG. 2C can be related to the quality information shown in FIG. 2B.

Figure 2E:
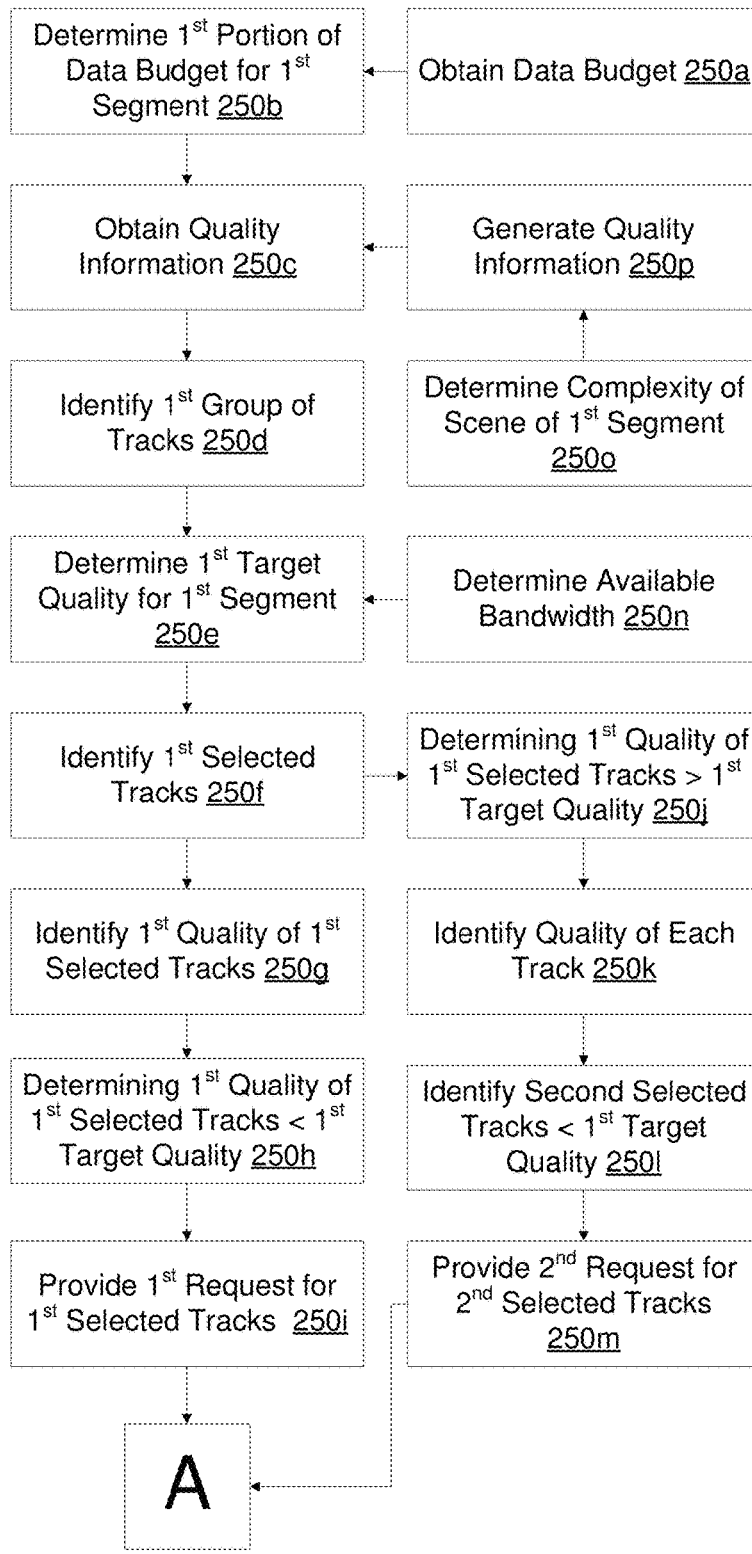
FIGS. 2E-2G depicts illustrative embodiment of methods in accordance with various aspects described herein.
Figure 2F:
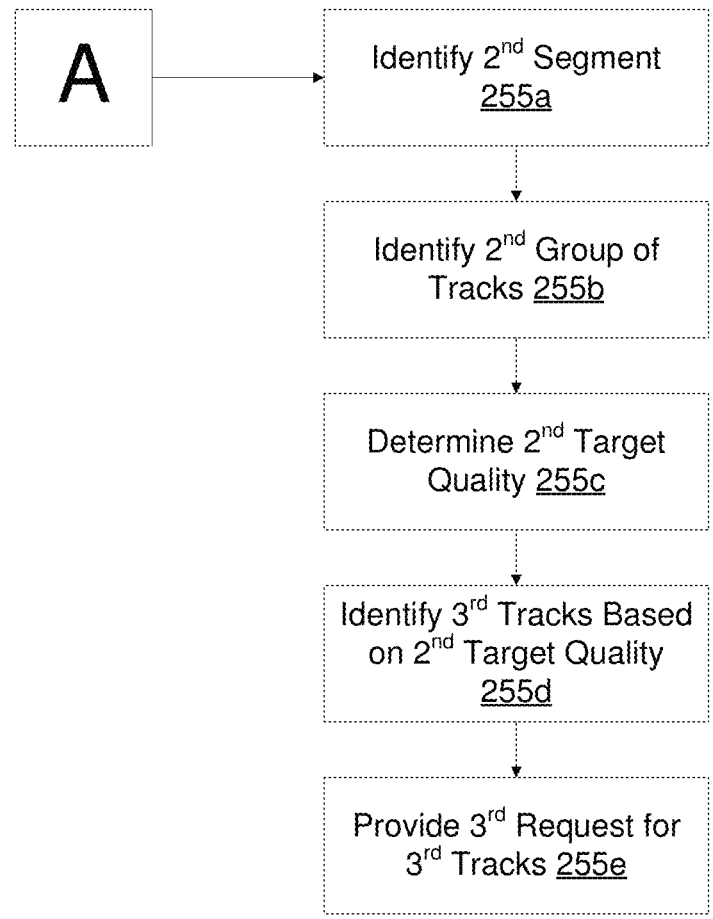
Figure 2G:
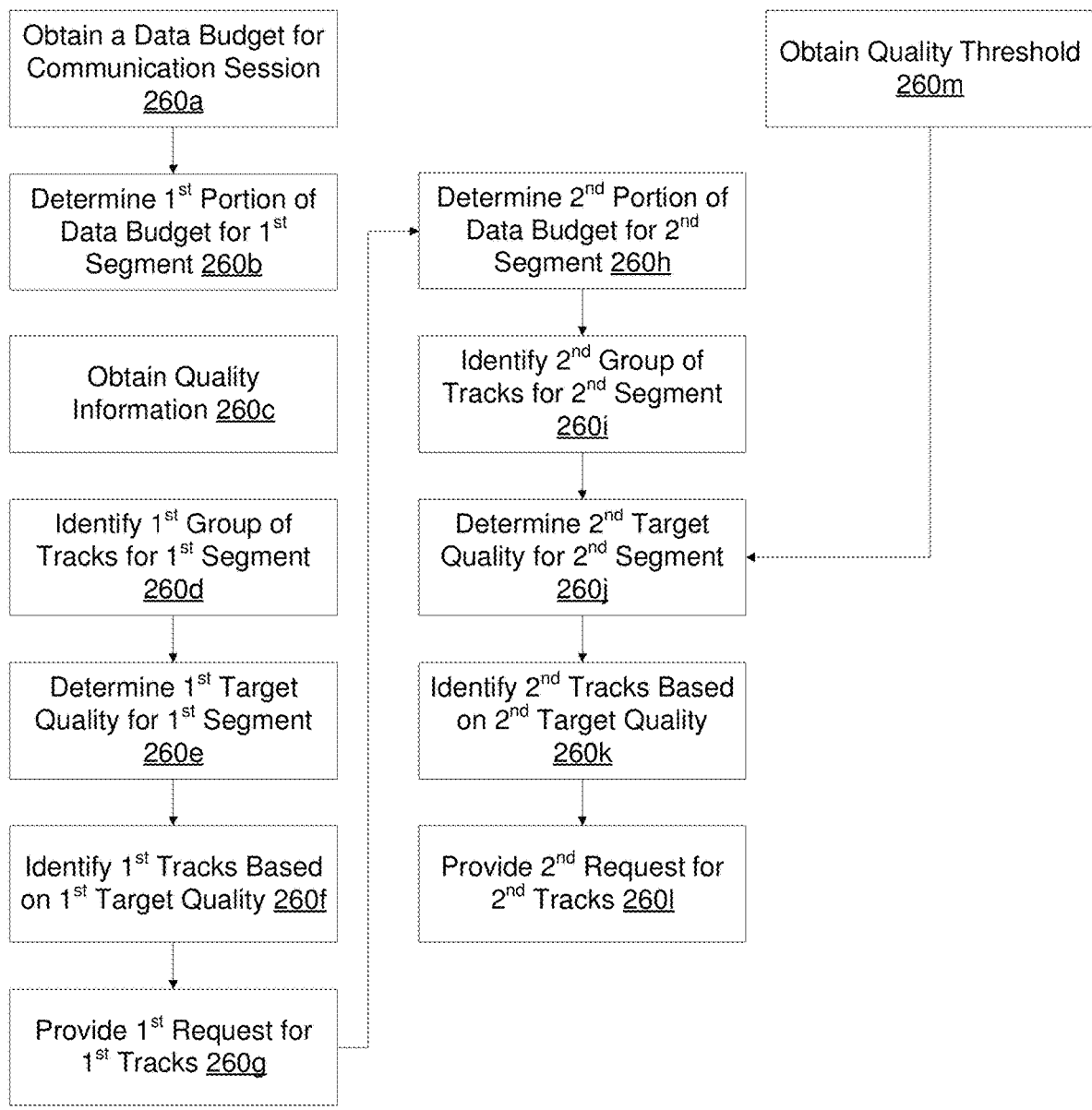

FIGS. 2E-2G depicts illustrative embodiment of methods in accordance with various aspects described herein. Referring to FIG. 2E, in one or more embodiments, aspects of method 250 can be implemented a communication device utilizing a data planning application in conjunction with an ABR client streaming application, or by a video content server. The method 250 can include the communication device, at 250*a*, obtaining a data budget associated with a communication session for streaming video content over a communication network from a video content server. Further, the method 250 can include the communication device, at 250*b*, determining a first portion of the data budget that is associated with a first segment of the video content. In addition, the method 250 can include the communication device, at 250*c*, obtaining quality information associated with the video content from the video content server over the communication network. Also, the method 250 can include the communication device, at 250*d*, identifying a first group of tracks for the first segment. Further, the method 250 can include the communication device, at 250*e*, determining a first target quality for the first segment based on the first portion of the data budget and the quality information.

In one or more embodiments, the method 250 can include the communication device, at 250*f*, identifying a first portion of the first group of tracks resulting in a first group of selected tracks, and, at 250*g*, identifying a first quality of the first group of selected tracks. Further, the method 250 can include the communication device, at 250*h*, determining that the first quality of the first group of selected tracks is less than or equal to the first target quality. In addition, the method 250 can include the communication device, at 250*i*, providing, over the communication network, a first request for the first group of selected tracks from the video content server during the communication session.

In one or more embodiments, the method 250 can include the communication device, at 250*j*, determining that the first quality of the first group of selected tracks is greater than the first target quality. Further, the method 250 can include the communication device, at 250*k*, identifying a quality of each track of the first group of tracks resulting in a group of qualities. In addition, the method 250 can include the communication device, at 250*l*, identifying a second portion of the first group of tracks that has an associated quality that is less than or equal to the first target quality resulting in a second group of selected tracks. Also, the method 250 can include the communication device, at 250*m*, providing, over the communication network, a second request for the second group of selected tracks to the video content server during the communication session.

In one or more embodiments, the method 250 can include the communication device, at 250n, determining an available bandwidth of the communication network. In some embodiments, the determining of the first target quality for the first segment comprises determining the first target quality for the first segment according to the available bandwidth.

In one or more embodiments, the method 250 can include the video content server, at 250o, determining an amount of complexity in a group of scene associated with the video content. Further, the method 250 can include the video content server, at 250p, generating the quality information associated with the video content from determining an amount of complexity in the group of scenes.

In one or more embodiments, the communication device can determine a first time period within the communication session associated with the first target quality, the first time period is associated with a first plurality of segments, and the first plurality of segments comprises the first segment. Further, the communication device can determine a length of time of the communication session. The determining of the first time period can comprise determining the first time period based on the length of time of the communication session. In other embodiments, the communication device can receive user-generated input that indicates the first time period, and the determining of the first time period can comprise determining the first time period based on the user-generated input.

Referring to FIG. 2F, in one or more embodiments, aspects of method 255 can be implemented by a communication device utilizing a data planning application in conjunction with an ABR client streaming application. The method 255 can include the communication device, at 255a, identifying a second segment of a second plurality of segments associated with a second time period within the communication session. Further, the method 255 can include the communication device, at 255b, identifying a second group of tracks for the second segment. In addition, the method 255 can include the communication device, at 255c, determining a second target quality for the second segment based on a second portion of the data budget. Also, the method 255 can include the communication device, at 255d, identifying a third portion of the second group of tracks based on the second target quality resulting in a third group of selected tracks according to the second target quality. The method 255 can include the communication device, at 255e, providing, over a communication network, a third request for the third group of selected tracks from the video content server during the communication session.

Referring to FIG. 2G, in one or more embodiments, aspects of method 260 can be implemented by a communication device utilizing a data planning application in conjunction with an ABR client streaming application. The method 260 can include the communication device, at 260a, obtaining a data budget associated with a communication session for streaming video content over a communication network from a video content server. Further, the method 260 can include the communication device, at 260b, determining a first portion of the data budget that is associated with a first segment of the video content. In addition, the method 260 can include the communication device, at 260c, obtaining quality information associated with the video content from the video content server over the communication network. Also, the method 260 can include the communication device, at 260d, identifying a first group of tracks for the first segment. The method 250 can include the communication device, at 260e, determining a first target quality for the first segment based on the first portion of the data budget and the quality information utilizing a binary search algorithm. Further, the method 260 can include the communication device, at 260f, identifying a first portion of the first group of tracks according to the first target quality. In addition, the method 260 can include the communication device, at 260g, providing a first request for the first portion of the first group of tracks to the video content server over the communication network.

In one or more embodiments, the method 260 can include the communication device, at 260h, determining a second portion of the data budget that is associated with a second segment of the video content. Further, the method 260 can include the communication device, at 260i, identifying a second group of tracks for the second segment. In addition, the method 260 can include the communication device, at 260j, determining a second target quality for the second segment based on the second portion of the data budget and the quality information utilizing the binary search algorithm. Also, the method 260 can include the communication device, at 260k, identifying a second portion of the second group of tracks according to the second target quality. Further, the method 260 can include the communication device, at 260l, providing a second request for the second portion of the second group of tracks to the video content over the communication network. In addition, the method 260 can include the communication device, at 260m, obtaining a quality threshold. The determining of the second target quality can comprise determining that the second target quality is within the quality threshold of the first target quality Tracks (e.g., ABR tracks) received for a second segment within a quality threshold of the tracks that are received in a first segment can ensure that the quality between the first segment and the second segment is a smooth transition and enhance a user's QoE when both the tracks for the first segment and the tracks for the second segment are presented to a user of viewing the video content on the communication device. The quality threshold can be obtained by user-generated input from a communication device parameter or as a configurable parameter of a data planning application residing and executing on the communication device.

In one or more embodiments, portions of the data planning application and/or the ABR client streaming application can be implemented by a communication device to perform aspects of method 250, method 255, and method 260. This can include the communication device identifying a target quality and requesting a portion of a group of tracks generated (and selected) by the ABR streaming application from the mobile network server and/or video content server according to the target quality.

While for purposes of simplicity of explanation, the respective processes are shown and described as a series of blocks in FIGS. 2E-2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Some blocks can be performed in response to one or more other blocks.

Portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 220, 230, 240 and methods 250, 255, 260 presented in FIGS. 1, 2A-2G, and 3. For example, virtualized communication network 300 can facilitate in whole or in part streaming video content according to available encoding quality information.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
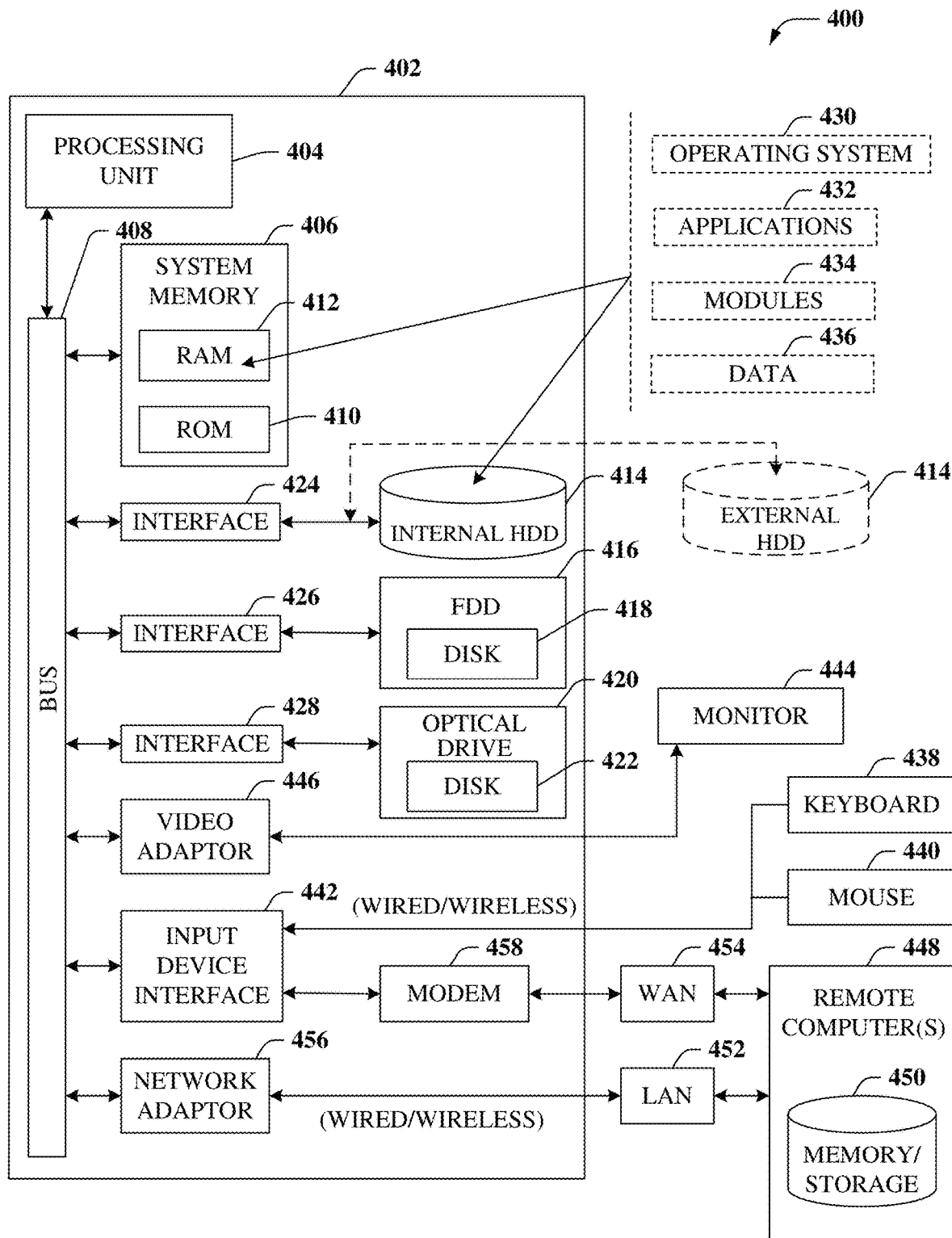
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part streaming video content according to available encoding quality information. Further, video content server 202, mobile network server 206, and communication device 210 can each comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
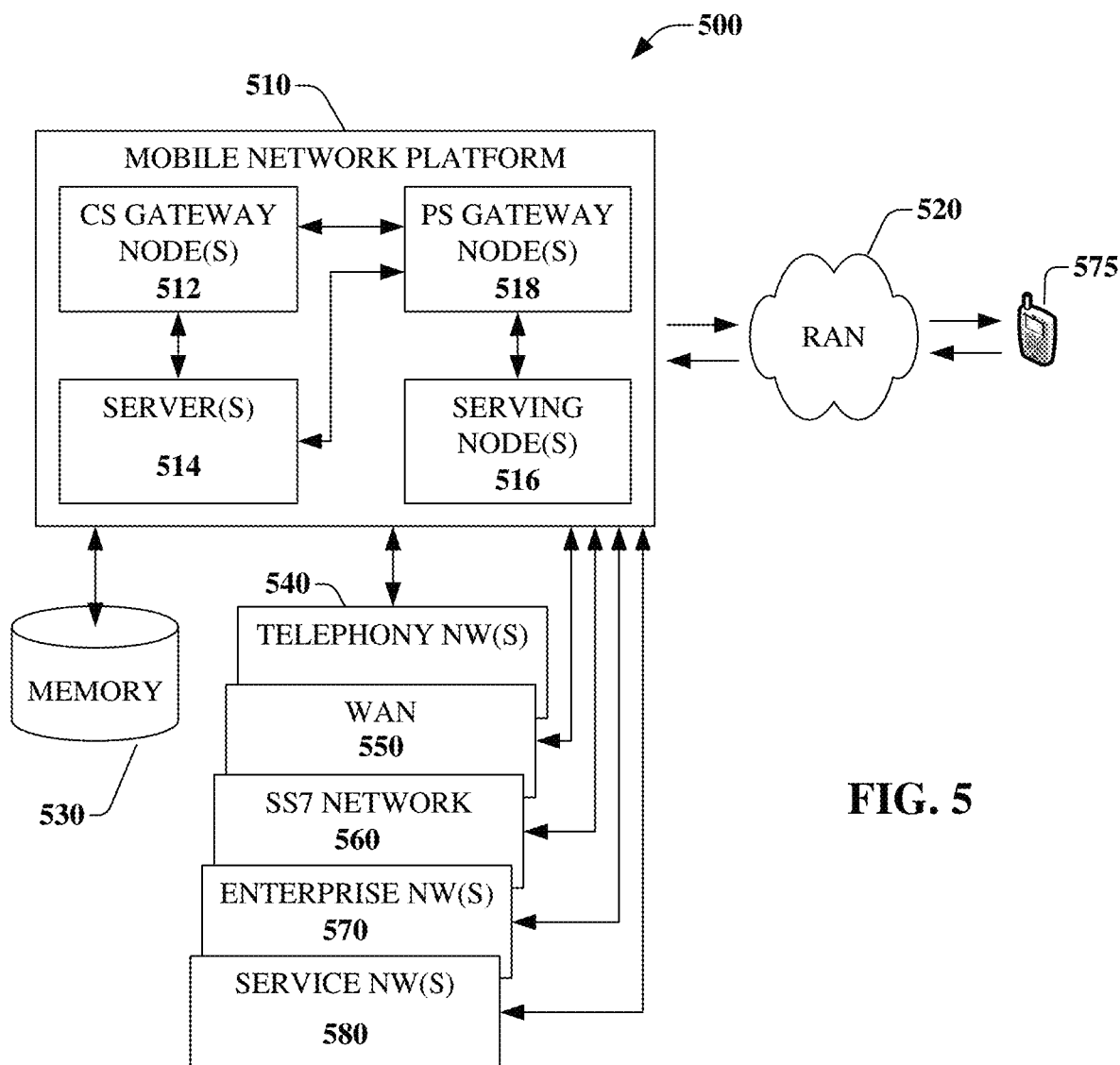
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part streaming video content according to available encoding quality information. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS).

Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500*l*, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
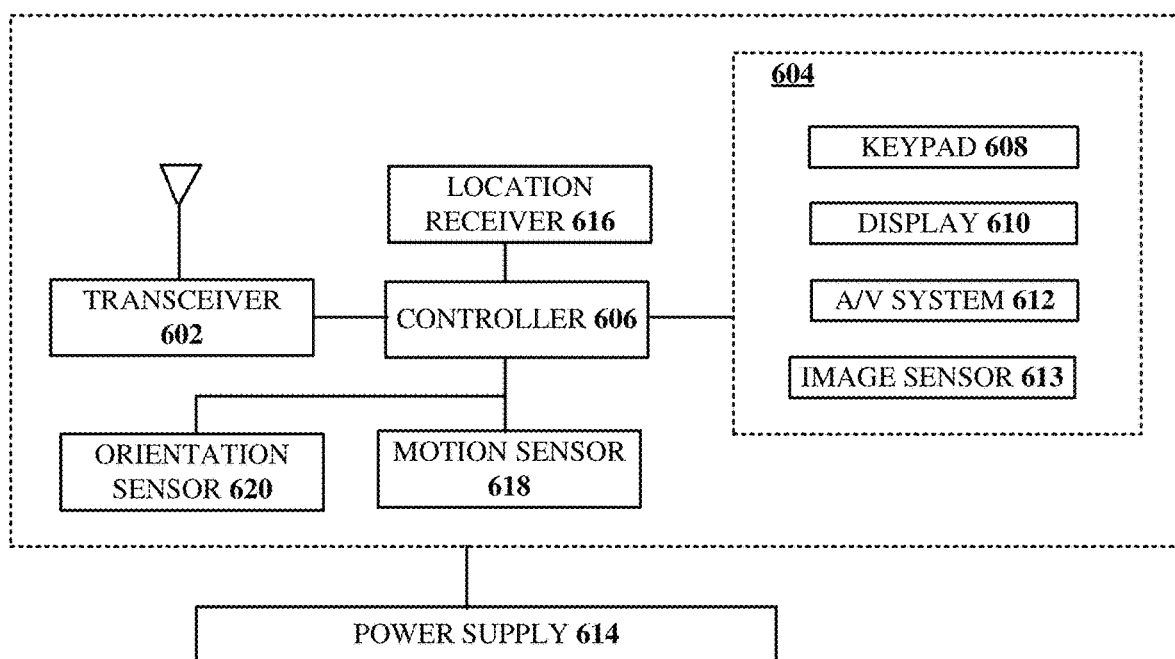
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part streaming video content according to available encoding quality information. Further, video content server 202, mobile network server 206, and communication device 210 can each comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    obtaining, by a processing system including a processor of a communication device, a data budget associated with a communication session for streaming video content over a communication network from a video content server;
    determining, by the processing system, a first portion of the data budget that is associated with a first segment of the video content;
    obtaining, by the processing system, quality information from the video content server over the communication network, wherein the quality information is associated with an amount of complexity of the video content;
    identifying, by the processing system, a first group of tracks for the first segment;
    determining, by the processing system, a first target quality for the first segment based on the first portion of the data budget and the quality information utilizing a binary search algorithm;
    identifying, by the processing system, a first portion of the first group of tracks according to the first target quality;
    providing, by the processing system, a first request for the first portion of the first group of tracks to the video content server over the communication network;
    determining, by the processing system, a second target quality for a second segment of the video content based on a second portion of the data budget and the quality information utilizing the binary search algorithm; and obtaining by the processing system, a quality threshold of the first target quality, wherein the determining the second target quality comprises determining that the second target duality is within the quality threshold of the first target quality.

2. The method of claim 1, comprising:

identifying, by the processing system, a second group of tracks for the second segment;

identifying, by the processing system, a second portion of the second group of tracks according to the second target quality; and providing, by the processing system, a second request for the second portion of the second group of tracks to the video content over the communication network.

3. The method of claim 1, wherein the video content server generates the quality information associated with the video content from determining an amount of complexity in a group of scenes associated with the video content.

4. A communication device, comprising:

a processing system including a processor; and a memory that stores executable instructions that, when executed by the processing system, facilitate performance of operations, the operations comprising:

obtaining a data budget associated with a communication session for streaming video content over a communication network from a video content server;

determining a first portion of the data budget that is associated with a first segment of the video content;

obtaining quality information from the video content server over the communication network, wherein the quality information is associated with an amount of complexity of the video content;

identifying a first group of tracks for the first segment;

determining a first target quality for the first segment based on the first portion of the data budget and the quality information;

determining a second target quality for a second segment of the video content based on a second portion of the data budget and the quality information; and obtaining a quality threshold of the first target quality, wherein the determining the second target quality comprises determining that the second target quality is within the quality threshold of the first target quality.

5. The communication device of claim 4, wherein the operations comprise:

identifying a first portion of the first group of tracks resulting in a first group of selected tracks; and identifying a first quality of the first group of selected tracks.

6. The communication device of claim 5, wherein the operations comprise:

determining that the first quality of the first group of selected tracks is less than or equal to the first target quality; and providing, over the communication network, a first request for the first group of selected tracks from the video content server during the communication session.

7. The communication device of claim 5, wherein the operations comprise:

determining that the first quality of the first group of selected tracks is greater than the first target quality;

identifying a quality of each track of the first group of tracks resulting in a group of qualities;

identifying a second portion of the first group of tracks that has an associated quality that is less than or equal to the first target quality resulting in a second group of selected tracks; and providing, over the communication network, a second request for the second group of selected tracks to the video content server during the communication session.

8. The communication device of claim 4, wherein the operations comprise determining an available bandwidth of the communication network, wherein the determining of the first target quality for the first segment comprises determining the first target quality for the first segment according to the available bandwidth.

9. The communication device of claim 4, wherein the determining of the first target quality comprises determining the first target quality utilizing a binary search algorithm.

10. The communication device of claim 4, wherein the video content server generates the quality information associated with the video content from determining an amount of complexity in a group of scenes associated with the video content.

11. The communication device of claim 4, wherein the operations comprise determining a first time period within the communication session associated with the first target quality, wherein the first time period is associated with a first plurality of segments, and wherein the first plurality of segments comprises the first segment.

12. The communication device of claim 11, wherein the operations comprise determining a length of time of the communication session, wherein the determining of the first time period comprises determining the first time period based on the length of time of the communication session.

13. The communication device of claim 11, wherein the operations comprise receiving user-generated input that indicates the first time period, wherein the determining of the first time period comprises determining the first time period based on the user-generated input.

14. The communication device of claim 4, wherein the second segment comprises one of a second plurality of segments associated with a second time period within the communication session and wherein the operations further comprise:

identifying a second group of tracks for the second segment;

identifying a third portion of the second group of tracks based on the second target quality resulting in a third group of selected tracks according to the second target quality; and providing, over the communication network, a third request for the third group of selected tracks from the video content server during the communication session.

15. A non-transitory, machine-readable medium, comprising executable instructions that, when executed by a processing system including a processor of a communication device, facilitate performance of operations, the operations comprising:

obtaining a data budget associated with a communication session for streaming video content over a communication network from a video content server;

determining a first portion of the data budget that is associated with a first segment of the video content;

identifying a first group of tracks for the first segment;

determining an available bandwidth associated the communication network;

obtaining quality information from the video content server over the communication network, wherein the quality information is associated with an amount of complexity of the video content;

determining a first target quality for the first segment based on the first portion of the data budget, the quality information, and the available bandwidth;

determining a second target quality for a second segment of the video content based on a second portion of the data budget and the quality information; and obtaining a quality threshold of the first target quality, wherein the determining the second target quality comprises determining that the second target quality is within the quality threshold of the first target quality.

16. The non-transitory, machine-readable medium of claim 15, wherein the operations comprise:

identifying a first portion of the first group of tracks resulting in a first group of selected tracks; and identifying a first quality of the first group of selected tracks.

17. The non-transitory, machine-readable medium of claim 16, wherein the operations comprise:

determining that the first quality of the first group of selected tracks is less than or equal to the first target quality; and providing, over the communication network, a first request for the first group of selected tracks from the video content server the communication session.

18. The non-transitory, machine-readable medium of claim 16, wherein the operations comprise:

determining that the first quality of the first group of selected tracks is greater than the first target quality;

identifying a quality of each track of the first group of tracks resulting in a group of qualities;

identifying a second portion of the first group of tracks that has an associated quality that is less than or equal to the first target quality resulting in a second group of selected tracks; and providing, over the communication network, a second request for the second group of selected tracks to the video content server during the communication session.

19. The non-transitory, machine-readable medium of claim 15, wherein the determining of the first target quality comprises determining the first target quality utilizing a binary search algorithm.

20. The non-transitory, machine-readable medium of claim 15, wherein the video content server generates the quality information associated with the video content from determining an amount of complexity in a group of scenes associated with the video content.

* * * * *